US012634025B2

(12) United States Patent
Kompala et al.

(10) Patent No.: US 12,634,025 B2
(45) Date of Patent: May 19, 2026

(54) TECHNIQUES FOR APPLYING BEAM REFINEMENT GAIN

(71) Applicant: QUALCOMM Incorporated, San Diego, CA (US)

(72) Inventors: Surendra Kompala, Fremont, CA (US); Sachin Jain, Milpitas, CA (US); Mihir Vijay Laghate, San Diego, CA (US); Isan Doshi, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 18/298,979

(22) Filed: Apr. 11, 2023

(65) Prior Publication Data

US 2023/0327788 A1 Oct. 12, 2023

Related U.S. Application Data

(60) Provisional application No. 63/362,875, filed on Apr. 12, 2022.

(51) Int. Cl.
*H04W 4/00* (2018.01)
*H04B 17/391* (2015.01)
(Continued)

(52) U.S. Cl.
CPC ......... *H04B 17/391* (2015.01); *H04L 5/0048* (2013.01); *H04W 24/08* (2013.01); *H04B 17/318* (2015.01); *H04B 17/328* (2023.05)

(58) Field of Classification Search
None
See application file for complete search history.

(56) References Cited

U.S. PATENT DOCUMENTS

| | | | |
|---|---|---|---|
| 8,111,193 B2 * | 2/2012 | Nurmela | G01S 11/06 |
| | | | 342/458 |
| 2005/0124368 A1 * | 6/2005 | Diao | H04B 1/7113 |
| | | | 375/E1.032 |

(Continued)

OTHER PUBLICATIONS

Huang C., et al., "Machine Learning-Enabled LOS/NLOS Identification for MIMO Systems in Dynamic Environments", IEEE Transactions on Wireless Communications, IEEE Service Center, Piscataway, NJ, US, vol. 19, No. 6, Jan. 24, 2020, pp. 3643-3657, XP011793156, ISSN: 1536-1276, DOI: 10.1109/TWC.2020. 2967726 [retrieved on Jun. 10, 2020] p. 1 Section IV; p. 6-p. 7.

(Continued)

*Primary Examiner* — Bob A Phunkulh
(74) *Attorney, Agent, or Firm* — Harrity & Harrity LLP/Qualcomm

(57) ABSTRACT

Various aspects of the present disclosure generally relate to wireless communication. In some aspects, a user equipment (UE) may receive one or more reference signals via one or more beams. The UE may identify a channel model associated with a transmission path of the one or more reference signals. The UE may transmit a report associated with the one or more reference signals, and the report is based at least in part on a beam refinement gain associated with the channel model. Numerous other aspects are described.

30 Claims, 10 Drawing Sheets

700 ➔

(51) Int. Cl.
    *H04L 5/00*         (2006.01)
    *H04W 24/08*     (2009.01)
    *H04B 17/318*    (2015.01)

(56)           References Cited

U.S. PATENT DOCUMENTS

| | | | | |
|---|---|---|---|---|
| 2007/0206626 | A1 | 9/2007 | Lee et al. | |
| 2017/0207845 | A1* | 7/2017 | Moon | H04B 7/088 |
| 2017/0212208 | A1* | 7/2017 | Baek | H04B 17/309 |
| 2018/0069606 | A1* | 3/2018 | Jung | H04B 7/0617 |
| 2019/0320405 | A1* | 10/2019 | Pan | G01S 5/0218 |
| 2019/0372688 | A1 | 12/2019 | Sadiq et al. | |
| 2021/0013952 | A1* | 1/2021 | Tumula | H04B 7/028 |
| 2021/0204182 | A1* | 7/2021 | Müller | H04L 1/0003 |
| 2022/0026550 | A1* | 1/2022 | Park | H04B 7/06952 |
| 2022/0026551 | A1* | 1/2022 | Park | G01S 13/723 |
| 2022/0077896 | A1* | 3/2022 | Jung | H04B 7/043 |
| 2023/0204705 | A1* | 6/2023 | Thomas | H04L 5/0048 |
| | | | | 342/450 |
| 2023/0247607 | A1* | 8/2023 | Hong | H04W 72/0453 |
| | | | | 370/252 |
| 2023/0353204 | A1* | 11/2023 | Petersson | H04B 7/063 |
| 2023/0388959 | A1* | 11/2023 | Hasegawa | G01S 5/0036 |
| 2024/0147254 | A1* | 5/2024 | Tao | H04B 7/0695 |
| 2024/0155596 | A1* | 5/2024 | Ganesan | H04B 7/0623 |
| 2024/0178903 | A1* | 5/2024 | Go | H04B 7/0408 |

OTHER PUBLICATIONS

International Search Report and Written Opinion—PCT/US2023/018367—ISA/EPO—Jun. 28, 2023.

* cited by examiner

700

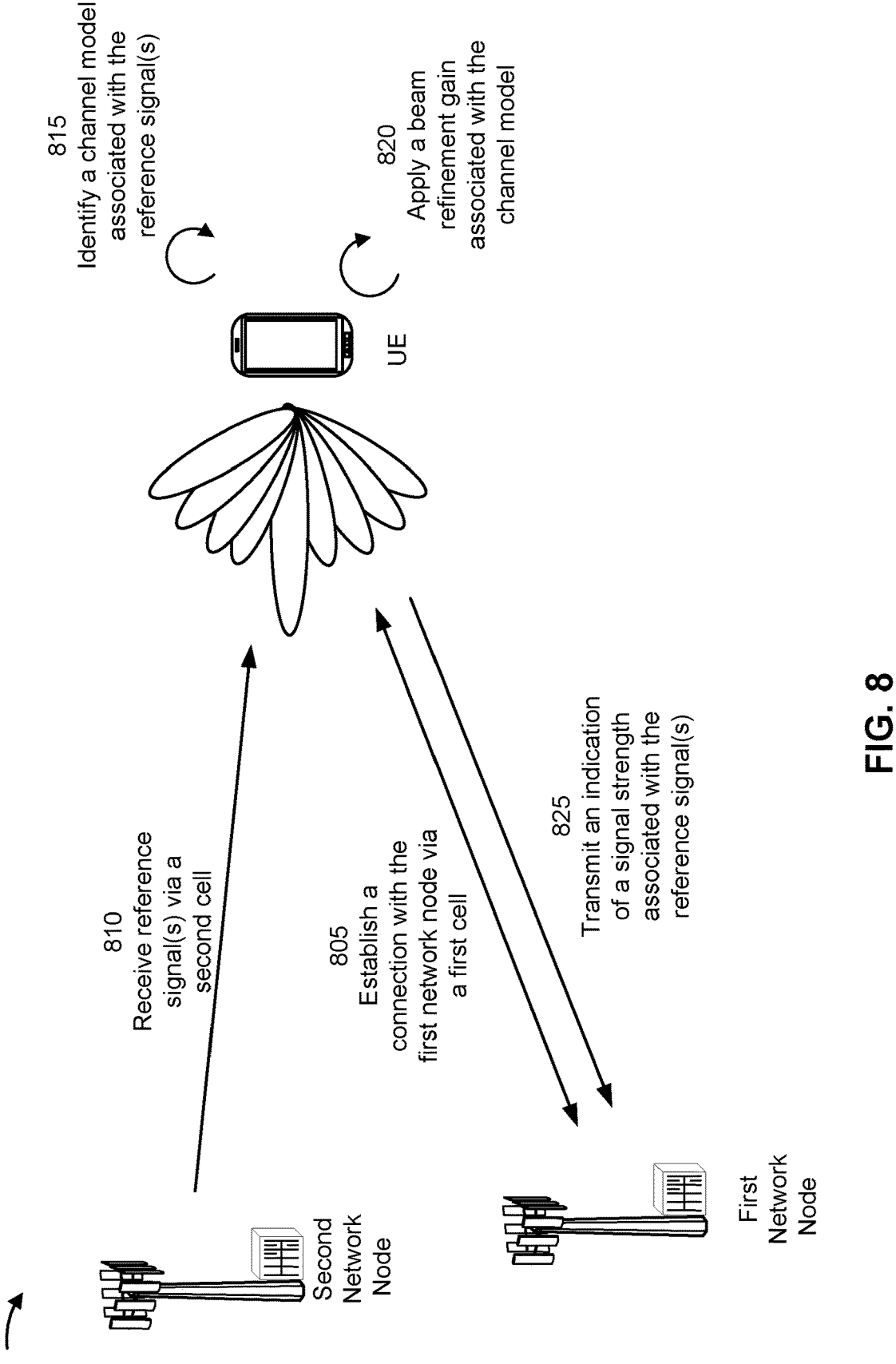

815
Identify a channel model associated with the reference signal(s)

820
Apply a beam refinement gain associated with the channel model

UE

810
Receive reference signal(s) via a second cell

805
Establish a connection with the first network node via a first cell

825
Transmit an indication of a signal strength associated with the reference signal(s)

Second Network Node

First Network Node

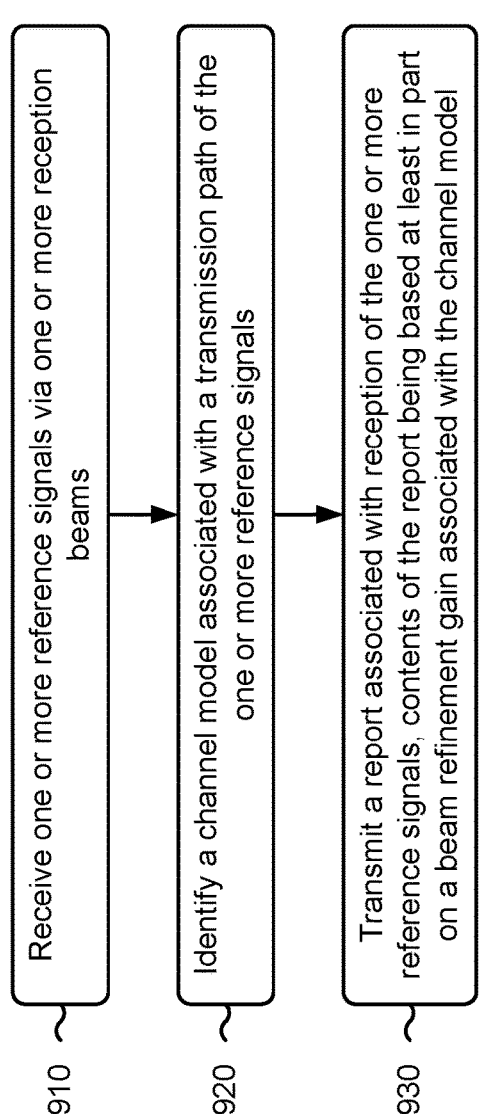

910 Receive one or more reference signals via one or more reception beams

920 Identify a channel model associated with a transmission path of the one or more reference signals 930 Transmit a report associated with reception of the one or more reference signals, contents of the report being based at least in part on a beam refinement gain associated with the channel model

TECHNIQUES FOR APPLYING BEAM REFINEMENT GAIN

CROSS-REFERENCE TO RELATED APPLICATION

This Patent application claims priority to U.S. Provisional Patent Application No. 63/362,875, filed on Apr. 12, 2022, entitled "TECHNIQUES FOR APPLYING BEAM REFINEMENT GAIN," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for applying beam refinement gain.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving one or more reference signals via one or more beams. The method may include identifying a channel model associated with a transmission path of the one or more reference signals. The method may include transmitting a report associated with the one or more reference signals, the report is based at least in part on a beam refinement gain associated with the channel model.

Some aspects described herein relate to a UE for wireless communication. The user equipment may include a memory and one or more processors coupled to the memory. The one or more processors may be configured to receive one or more reference signals via one or more beams. The one or more processors may be configured to identify a channel model associated with a transmission path of the one or more reference signals. The one or more processors may be configured to transmit a report associated with the one or more reference signals, the report is based at least in part on a beam refinement gain associated with the channel model.

Some aspects described herein relate to a non-transitory computer-readable medium that stores a set of instructions for wireless communication by a UE. The set of instructions, when executed by one or more processors of the UE, may cause the UE to receive one or more reference signals via one or more beams. The set of instructions, when executed by one or more processors of the UE, may cause the UE to identify a channel model associated with a transmission path of the one or more reference signals. The set of instructions, when executed by one or more processors of the UE, may cause the UE to transmit a report associated with the one or more reference signals, the report is based at least in part on a beam refinement gain associated with the channel model.

Some aspects described herein relate to an apparatus for wireless communication. The apparatus may include means for receiving one or more reference signals via one or more beams. The apparatus may include means for identifying a channel model associated with a transmission path of the one or more reference signals. The apparatus may include means for transmitting a report associated with the one or more reference signals, the report is based at least in part on a beam refinement gain associated with the channel model.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-8 are diagrams illustrating examples associated with applying beam refinement gain, in accordance with the present disclosure.

FIG. 9 is a diagram illustrating an example process associated with applying beam refinement gain, in accordance with the present disclosure.

DETAILED DESCRIPTION

Figure 1:
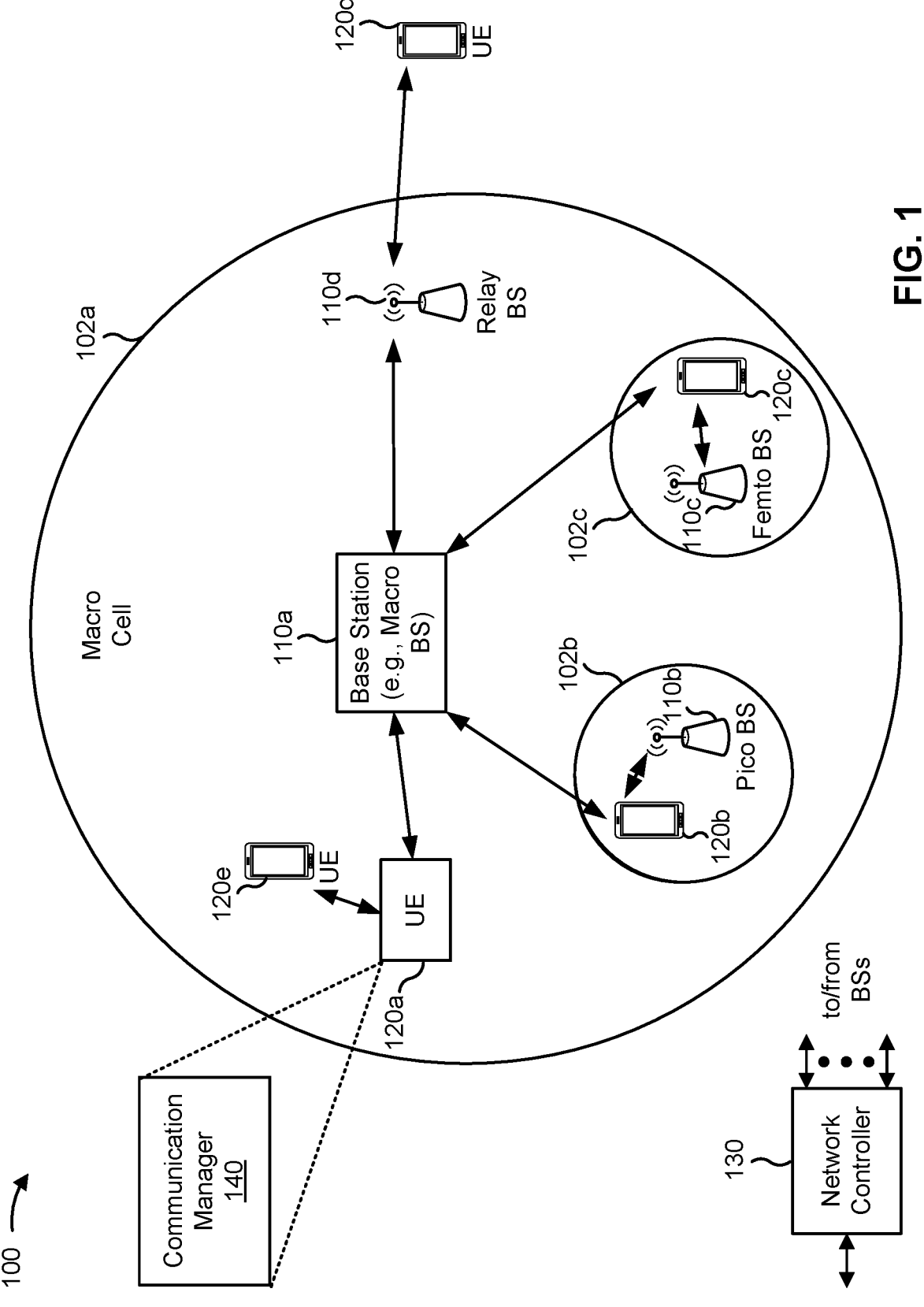
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Various aspects relate generally to beam refinement gains. Some aspects more specifically relate to applying different beam refinement gains for different channel models. In some examples, a user equipment (UE) may use a first beam refinement gain (or set of beam refinement gains) when measuring reference signals (RSs) via a line-of-sight (LOS) beam path and may use a second beam refinement gain (or set of beam refinement gains) when measuring RSs via a non-LOS beam path. In some aspects, selection of a beam refinement gain may be based at least in part on an operational frequency of a channel associated with the RSs.

Particular aspects of the subject matter described in this disclosure can be implemented to realize one or more of the following potential advantages. In some examples, by using a beam refinement gain that is based at least in part on the channel model and/or the one or more additional parameters, the described techniques can be used to report signal strength and/or a B1 event with improved accuracy and/or avoid reporting a B1 event when a reselection to the neighbor cell is likely to cause a radio link failure. In this way, the UE may conserve computing, power, network, and/or communication resources that may have otherwise been used to recover from a radio link failure and/or avoid or reduce ping-ponging between cells.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range (FR) designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive one or more reference signals via one or more beams; identify a channel model associated with a transmission path of the one or more reference signals; and transmit a report associated with the one or more reference signals, the report is based at least in part on a beam refinement gain associated with the channel model. Additionally, or alternatively, the communication manager 140 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
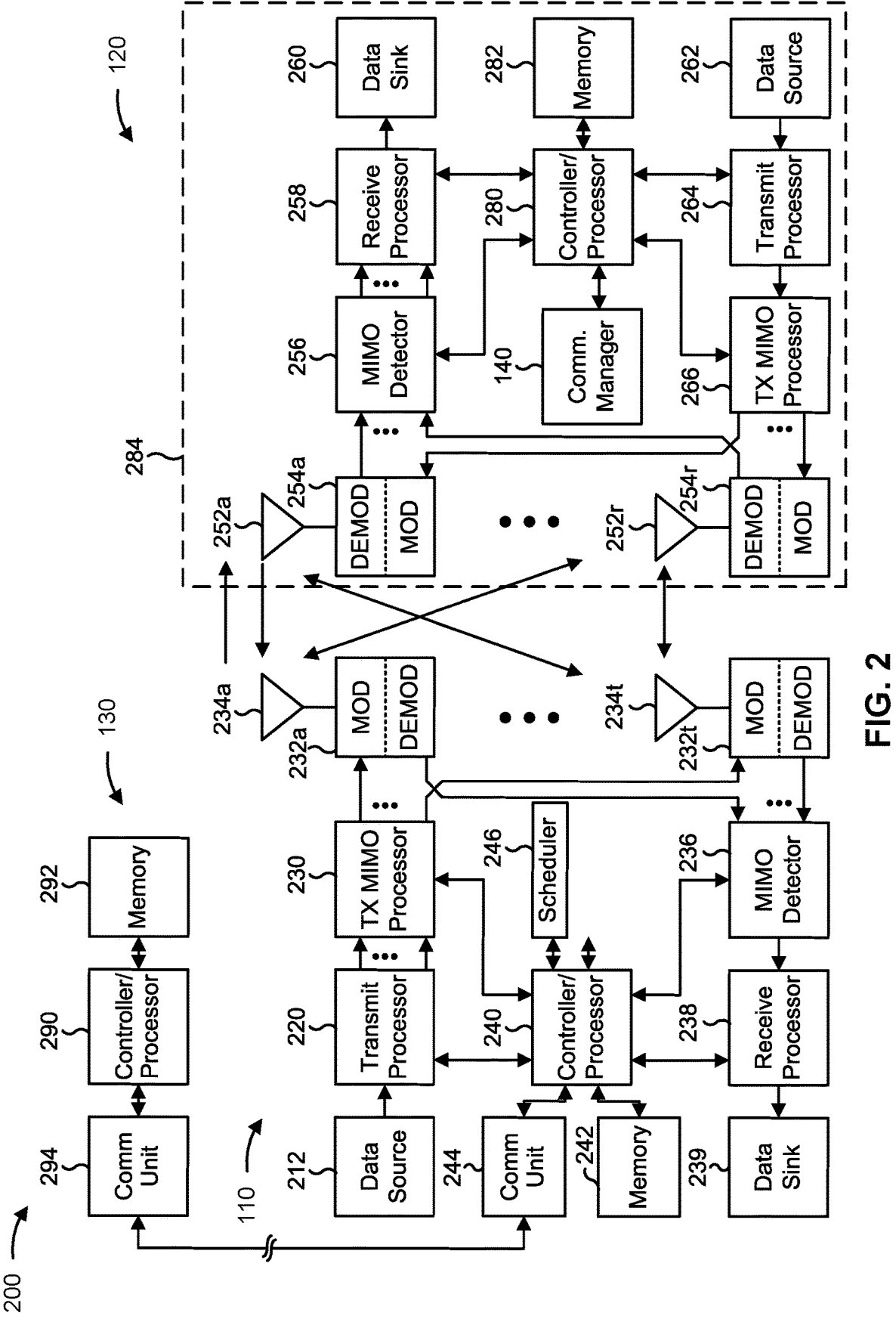
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements (AEs), and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with applying beam refinement gain, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9 and/or other processes as described herein. In some examples, executing instructions may include running the instructions, converting the instructions, compiling the instructions, and/or interpreting the instructions, among other examples.

In some aspects, the UE includes means for receiving one or more reference signals via one or more beams; means for identifying a channel model associated with a transmission path of the one or more reference signals; and/or means for transmitting a report associated with the one or more reference signals, the report is based at least in part on a beam refinement gain associated with the channel model. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
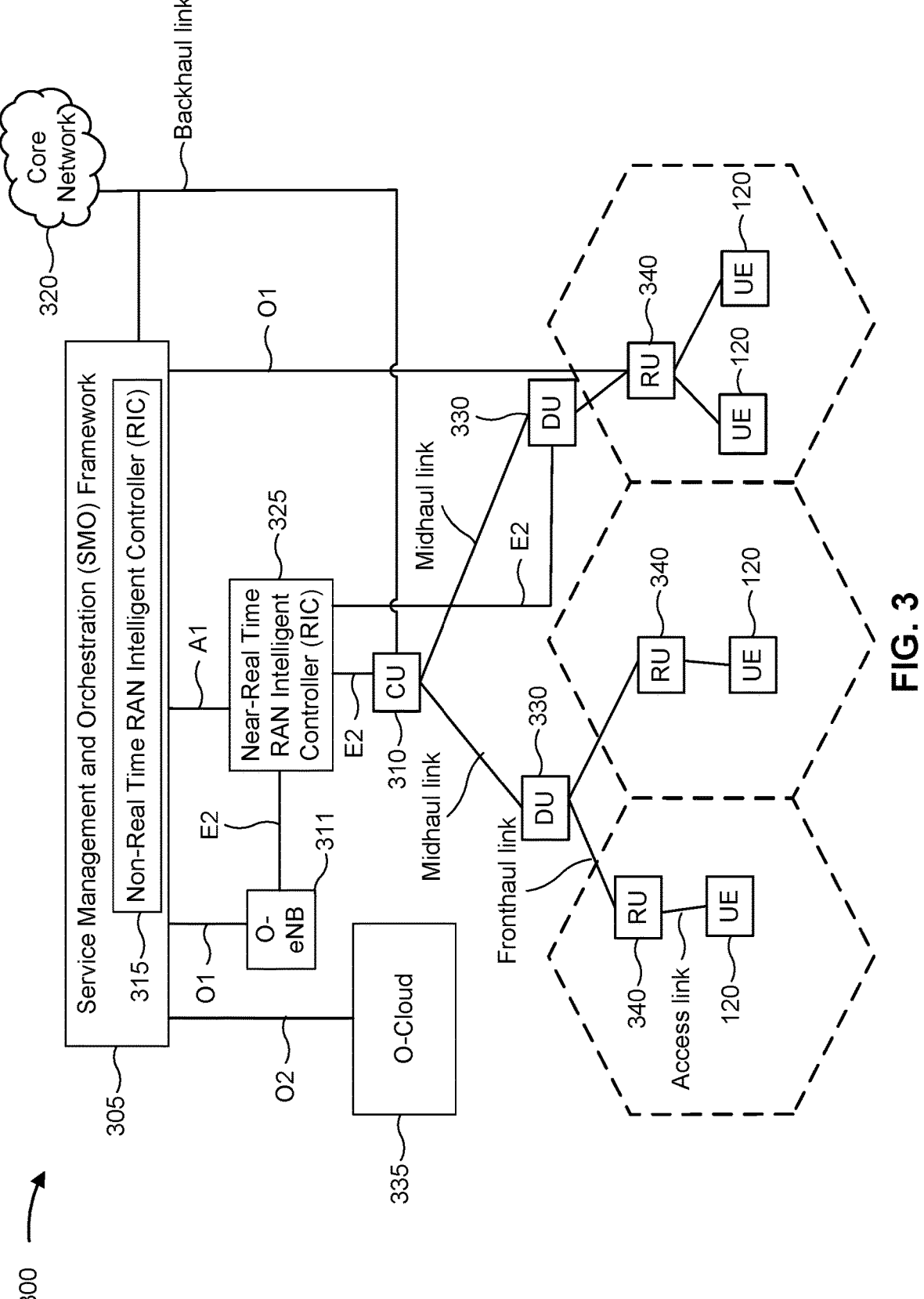
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 335) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
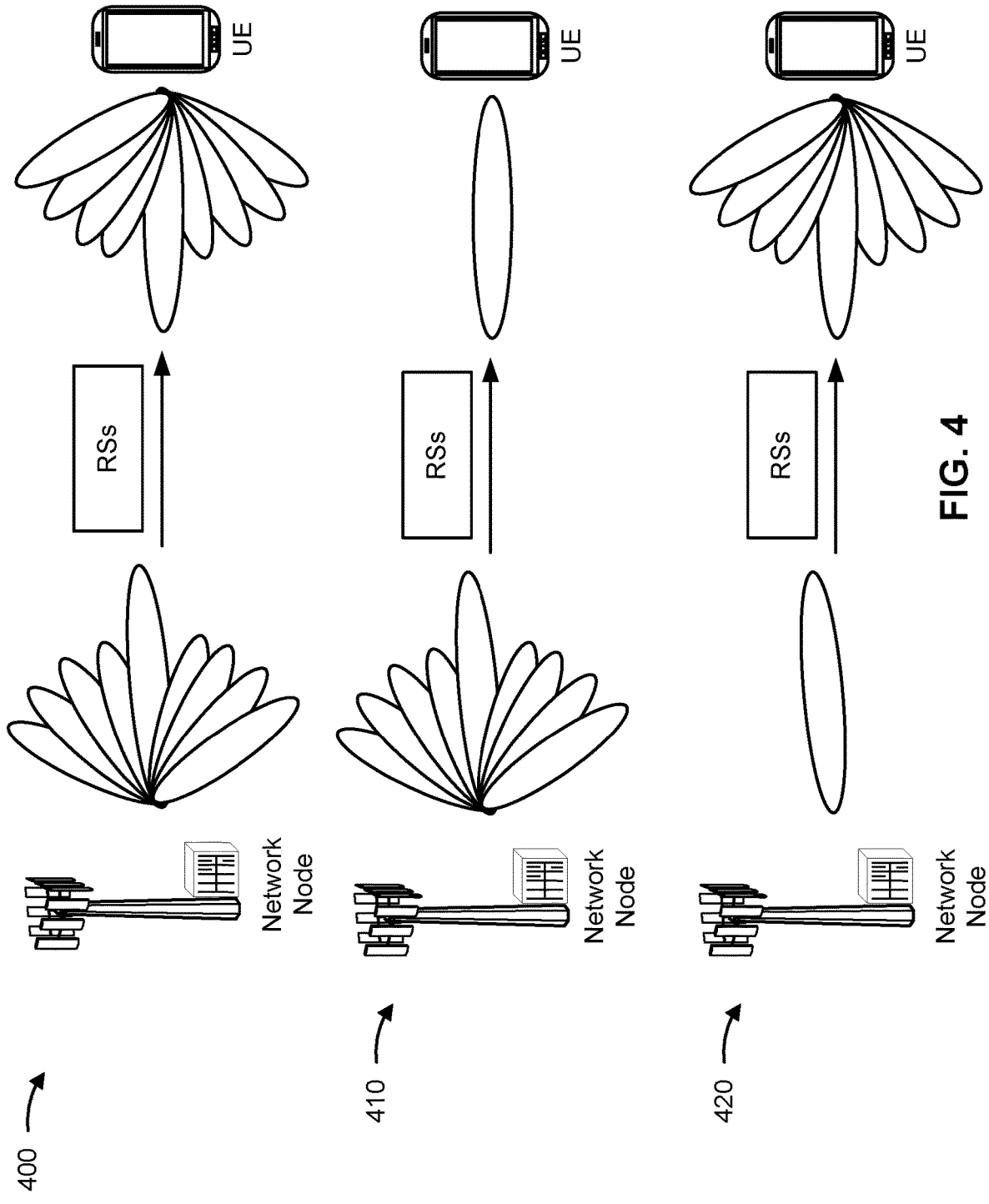
FIG. 4 is a diagram illustrating examples of beam management procedures, in accordance with the present disclosure.

FIG. 4 is a diagram illustrating examples 400, 410, and 420 of beam management procedures, in accordance with the present disclosure. As shown in FIG. 4, examples 400, 410, and 420 include a UE in communication with a network node in a wireless network (e.g., wireless network 100). However, the devices shown in FIG. 4 are provided as examples, and the wireless network may support communication and beam management between other devices (e.g., between a UE and a network node or TRP, between a mobile termination node and a control node, between an IAB child node and an IAB parent node, and/or between a scheduled node and a scheduling node). In some aspects, the UE and the network node may be in a connected state (e.g., an RRC connected state).

As shown in FIG. 4, example 400 may include a network node and a UE communicating to perform beam management using reference signals (RSs). Example 400 depicts a first beam management procedure (e.g., P1 beam management). The first beam management procedure may be referred to as a beam selection procedure, an initial beam acquisition procedure, a beam sweeping procedure, a cell search procedure, and/or a beam search procedure. As shown in FIG. 4 and example 400, RSs may be configured to be transmitted from the network node to the UE. The RSs may be configured to be periodic (e.g., using RRC signaling), semi-persistent (e.g., using MAC control element (MAC-CE) signaling), and/or aperiodic (e.g., using downlink control information (DCI)). The RSs may include channel state information reference signals (CSI-RSs) or synchronization signal blocks (SSBs), among other examples.

The first beam management procedure may include the network node performing beam sweeping over multiple transmit (Tx) beams. The network node may transmit an RS using each transmit beam for beam management. To enable the UE to perform receive (Rx) beam sweeping, the base station may use a transmit beam to transmit (e.g., with repetitions) each RS at multiple times within the same RS resource set so that the UE can sweep through receive beams in multiple transmission instances. For example, if the network node has a set of N transmit beams and the UE has a set of M receive beams, the RS may be transmitted on each of the N transmit beams M times so that the UE may receive M instances of the RS per transmit beam. In other words, for each transmit beam of the network node, the UE may perform beam sweeping through the receive beams of the UE. As a result, the first beam management procedure may enable the UE to measure a RS on different transmit beams using different receive beams to support selection of network node transmit beams/UE receive beam(s) beam pair(s). The UE may report the measurements to the network node to enable the network node to select one or more beam pair(s) for communication between the network node and the UE.

As shown in FIG. 4, example 410 may include a network node and a UE communicating to perform beam management using RSs. Example 410 depicts a second beam management procedure (e.g., P2 beam management). The second beam management procedure may be referred to as a beam refinement procedure, a base station beam refinement procedure, a TRP beam refinement procedure, and/or a transmit beam refinement procedure. As shown in FIG. 4 and example 410, RSs may be configured to be transmitted from the network node to the UE. The RSs may be configured to be aperiodic (e.g., using DCI). The second beam management procedure may include the network node performing beam sweeping over one or more transmit beams. The one or more transmit beams may be a subset of all transmit beams associated with the network node (e.g., determined based at least in part on measurements reported by the UE in connection with the first beam management procedure). The network node may transmit a RS using each transmit beam of the one or more transmit beams for beam management. The UE may measure each RS using a single (e.g., a same) receive beam (e.g., determined based at least in part on measurements performed in connection with the first beam management procedure). The second beam management procedure may enable the network node to select a best transmit beam based at least in part on measurements of the RSs (e.g., measured by the UE using the single receive beam) reported by the UE.

As shown in FIG. 4, example 420 depicts a third beam management procedure (e.g., P3 beam management). The third beam management procedure may be referred to as a beam refinement procedure, a UE beam refinement procedure, and/or a receive beam refinement procedure. As shown in FIG. 4 and example 420, one or more RSs may be configured to be transmitted from the network node to the UE. The RSs may be configured to be aperiodic (e.g., using DCI). The third beam management process may include the network node transmitting the one or more RSs using a single transmit beam (e.g., determined based at least in part on measurements reported by the UE in connection with the first beam management procedure and/or the second beam management procedure). To enable the UE to perform receive beam sweeping, the base station may use a transmit beam to transmit (e.g., with repetitions) RS at multiple times within the same RS resource set so that UE can sweep through one or more receive beams in multiple transmission instances. The one or more receive beams may be a subset of all receive beams associated with the UE (e.g., determined based at least in part on measurements performed in connection with the first beam management procedure and/ or the second beam management procedure). The third beam management procedure may enable the network node and/or the UE to select a best receive beam based at least in part on reported measurements received from the UE (e.g., of the RS of the transmit beam using the one or more receive beams).

In some networks, the described beam management procedures may be used to select beams for continued communication between the UE and a network node that supports a primary cell. In some networks, one or more of the described beam management procedures may be used in a reselection operation. For example, the UE may receive an RS (e.g., an SSB) from the network node, with the network node operating a neighbor cell (e.g., a neighbor to a current cell in which the UE is already communicating and/or connected). The neighbor cell may cover a different geographical area from the current cell, may use a different RAT, and/or may operate in a different FR, operational frequency, and/or bandwidth part, among other examples. The UE may measure the RS using a configured number of antenna elements in a group (e.g., 1 antenna element) for an initial measurement of the RS and/or may add a beam refinement gain to the initial measurement to generate an adjusted measurement of the RS. The adjusted measurement of the RS may estimate a signal strength associated with the RS if the UE had received the RS using multiple antenna elements to refine a UE beam. In this way, the adjusted measurement may be used to determine whether the UE should reselect to the neighbor cell based at least in part on the estimated signal strength.

As indicated above, FIG. 4 is provided as an example of beam management procedures. Other examples of beam management procedures may differ from what is described with respect to FIG. 4. For example, the UE and the network node may perform the third beam management procedure before performing the second beam management procedure, and/or the UE and the network node may perform a similar beam management procedure to select a UE transmit beam.

Figure 5:
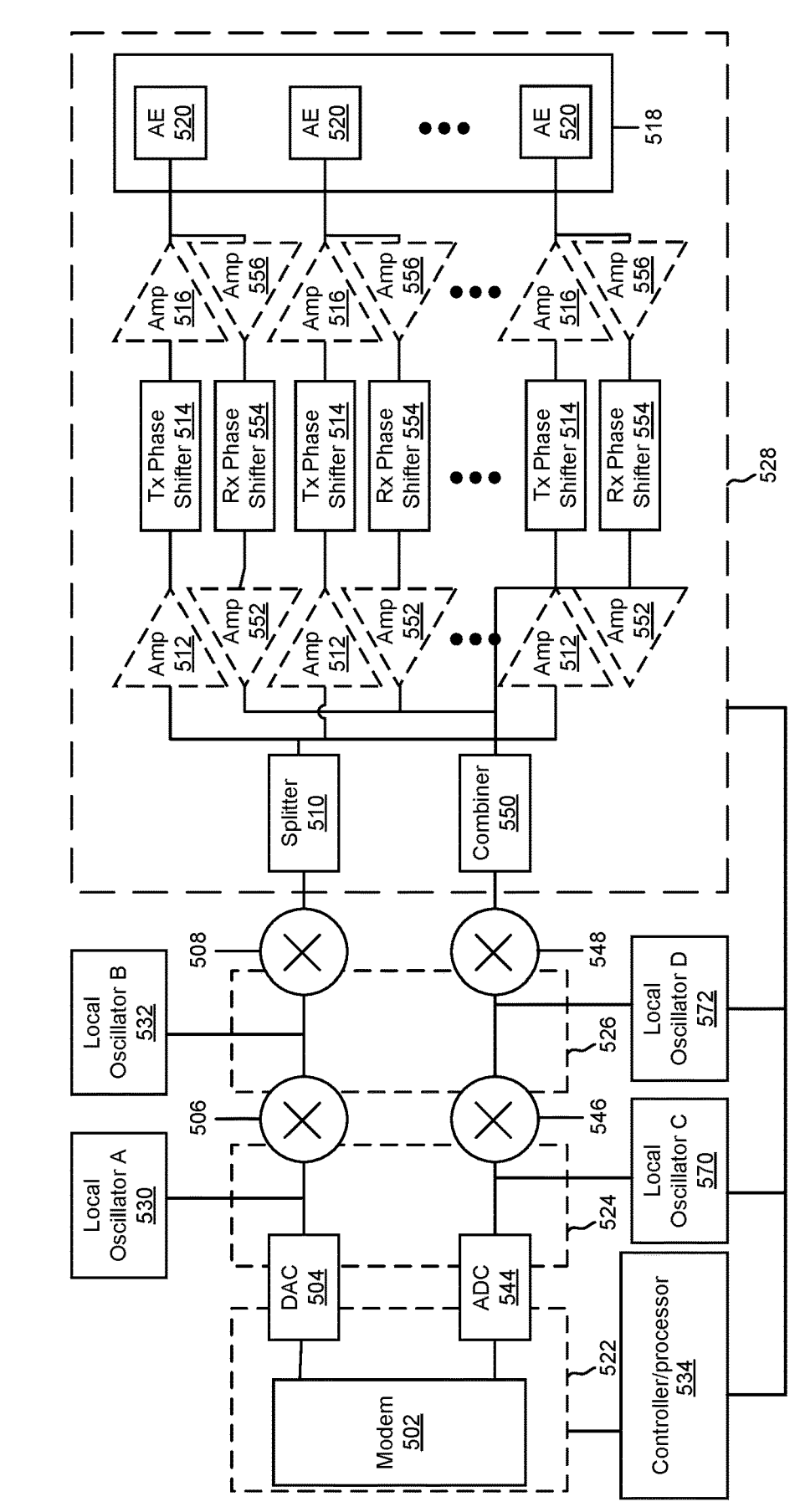
FIG. 5 is a diagram illustrating an example beamforming architecture that supports beamforming for millimeter wave (mmW) communications, in accordance with the present disclosure.

FIG. 5 is a diagram illustrating an example beamforming architecture 500 that supports beamforming for millimeter wave (mmW) communications, in accordance with the present disclosure. In some aspects, architecture 500 may implement aspects of wireless network 100. In some aspects, architecture 500 may be implemented in a transmitting device (e.g., a first wireless communication device, UE, or base station) and/or a receiving device (e.g., a second wireless communication device, UE, or base station), as described herein.

Broadly, FIG. 5 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 500 includes a modem (modulator/demodulator) 502, a digital to analog converter (DAC) 504, a first mixer 506, a second mixer 508, and a splitter 510. The architecture 500 also includes multiple first amplifiers 512, multiple phase shifters 514, multiple second amplifiers 516, and an antenna array 518 that includes multiple antenna elements 520. In some examples, the modem 502 may be one or more of the modems 232 or modems 254 described in connection with FIG. 2.

Transmission lines or other waveguides, wires, and/or traces are shown connecting the various components to illustrate how signals to be transmitted may travel between components. Reference numbers 522, 524, 526, and 528 indicate regions in the architecture 500 in which different types of signals travel or are processed. Specifically, reference number 522 indicates a region in which digital baseband signals travel or are processed, reference number 524 indicates a region in which analog baseband signals travel or are processed, reference number 526 indicates a region in which analog intermediate frequency (IF) signals travel or are processed, and reference number 528 indicates a region in which analog RF signals travel or are processed. The architecture also includes a local oscillator A 530, a local oscillator B 532, and a controller/processor 534. In some aspects, controller/processor 534 corresponds to controller/ processor 240 of the base station described above in connection with FIG. 2 and/or controller/processor 280 of the UE described above in connection with FIG. 2.

Each of the antenna elements 520 may include one or more sub-elements for radiating or receiving RF signals. For example, a single antenna element 520 may include a first sub-element cross-polarized with a second sub-element that can be used to independently transmit cross-polarized signals. The antenna elements 520 may include patch antennas, dipole antennas, or other types of antennas arranged in a linear pattern, a two dimensional pattern, or another pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases, some processing or filtering (not shown) may take place at the IF. The second mixer 508 upconverts the analog IF signals to analog RF signals using the local oscillator B 532. Similar to the first mixer, the second mixer 508 may mix the signals with an oscillating signal generated by the local oscillator B 532 to "move" the IF analog signals to the RF or the frequency at which signals will be transmitted or received. The modem 502 and/or the controller/processor 534 may adjust the frequency of local oscillator A 530 and/or the local oscillator B 532 so that a desired IF and/or RF frequency is produced and used to facilitate processing and transmission of a signal within a desired bandwidth.

In the illustrated architecture 500, signals upconverted by the second mixer 508 are split or duplicated into multiple signals by the splitter 510. The splitter 510 in architecture 500 splits the RF signal into multiple identical or nearly identical RF signals. In other examples, the split may take place with any type of signal, including with baseband digital, baseband analog, or IF analog signals. Each of these signals may correspond to an antenna element 520, and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some aspects. In some aspects, both the first amplifier 512 and second amplifier 516 are present. In some aspects, neither the first amplifier 512 nor the second amplifier 516 is present. In some aspects, one of the two amplifiers 512, 516 is present but not the other. By way of example, if the splitter 510 is an active splitter, the first amplifier 512 may not be used. By way of further example, if the phase shifter 514 is an active phase shifter that can provide a gain, the second amplifier 516 might not be used.

The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or the controller/processor 534) to provide independent control of the gain for each antenna element 520. For example, the modem 502 and/or the controller/processor 534 may have at least one control line connected to each of the splitter 510, first amplifiers 512, phase shifters 514, and/or second amplifiers 516 that may be used to configure a gain to provide a desired amount of gain for each component and thus each antenna element 520.

The phase shifter 514 may provide a configurable phase shift or phase offset to a corresponding RF signal to be transmitted. The phase shifter 514 may be a passive phase shifter not directly connected to a power supply. Passive phase shifters might introduce some insertion loss. The second amplifier 516 may boost the signal to compensate for the insertion loss. The phase shifter 514 may be an active phase shifter connected to a power supply such that the active phase shifter provides some amount of gain or prevents insertion loss. The settings of each of the phase shifters 514 are independent, meaning that each can be independently set to provide a desired amount of phase shift or the same amount of phase shift or some other configuration. The modem 502 and/or the controller/processor 534 may have at least one control line connected to each of the phase shifters 514 and which may be used to configure the phase shifters 514 to provide a desired amount of phase shift or phase offset between antenna elements 520.

In the illustrated architecture 500, RF signals received by the antenna elements 520 are provided to one or more first amplifiers 556 to boost the signal strength. The first amplifiers 556 may be connected to the same antenna arrays 518 (e.g., for time division duplex (TDD) operations). The first amplifiers 556 may be connected to different antenna arrays 518. The boosted RF signal is input into one or more phase shifters 554 to provide a configurable phase shift or phase offset for the corresponding received RF signal to enable reception via one or more Rx beams. The phase shifter 554 may be an active phase shifter or a passive phase shifter. The settings of the phase shifters 554 are independent, meaning that each can be independently set to provide a desired amount of phase shift or the same amount of phase shift or some other configuration. The modem 502 and/or the controller/processor 534 may have at least one control line connected to each of the phase shifters 554 and which may be used to configure the phase shifters 554 to provide a desired amount of phase shift or phase offset between antenna elements 520 to enable reception via one or more Rx beams.

The outputs of the phase shifters 554 may be input to one or more second amplifiers 552 for signal amplification of the phase shifted received RF signals. The second amplifiers 552 may be individually configured to provide a configured amount of gain. The second amplifiers 552 may be individually configured to provide an amount of gain to ensure that the signals input to combiner 550 have the same magnitude. The amplifiers 552 and/or 556 are illustrated in dashed lines because they might not be necessary in some aspects. In some aspects, both the amplifier 552 and the amplifier 556 are present. In another aspect, neither the amplifier 552 nor the amplifier 556 are present. In other aspects, one of the amplifiers 552, 556 is present but not the other.

In the illustrated architecture 500, signals output by the phase shifters 554 (via the amplifiers 552 when present) are combined in combiner 550. The combiner 550 in architecture 500 combines the RF signal into a signal. The combiner 550 may be a passive combiner (e.g., not connected to a power source), which may result in some insertion loss. The combiner 550 may be an active combiner (e.g., connected to a power source), which may result in some signal gain. When combiner 550 is an active combiner, it may provide a different (e.g., configurable) amount of gain for each input signal so that the input signals have the same magnitude when they are combined. When combiner 550 is an active combiner, the combiner 550 may not need the second amplifier 552 because the active combiner may provide the signal amplification.

The output of the combiner 550 is input into mixers 548 and 546. Mixers 548 and 546 generally down convert the received RF signal using inputs from local oscillators 572 and 570, respectively, to create intermediate or baseband signals that carry the encoded and modulated information. The output of the mixers 548 and 546 are input into an analog-to-digital converter (ADC) 544 for conversion to digital signals. The digital signals output from ADC 544 are input to modem 502 for baseband processing, such as decoding, de-interleaving, or similar operations.

The architecture 500 is given by way of example only to illustrate an architecture for transmitting and/or receiving signals. In some cases, the architecture 500 and/or each portion of the architecture 500 may be repeated multiple times within an architecture to accommodate or provide an arbitrary number of RF chains, antenna elements, and/or antenna panels. Furthermore, numerous alternate architectures are possible and contemplated. For example, although only a single antenna array 518 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 522, 524, 526, 528) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 510, amplifiers 512, 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512, 516. By way of another example, a phase shift may be implemented by the second mixer 508 to obviate the need for a separate phase shifter 514. This technique is sometimes called local oscillator (LO) phase shifting. In some aspects of this configuration, there may be multiple IF to RF mixers (e.g., for each antenna element chain) within the second mixer 508, and the local oscillator B 532 may supply different local oscillator signals (with different phase offsets) to each IF to RF mixer.

The modem 502 and/or the controller/processor 534 may control one or more of the other components 504 through 572 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512, 516 of the multiple signals relative to each other. The controller/processor 534 may be located partially or fully within one or more other components of the architecture 500. For example, the controller/processor 534 may be located within the modem 502 in some aspects.

In some networks, a UE may be configured to measure RSs (e.g., SSBs) from a neighbor cell using a configured number of AEs 520. The configured number of AEs 520 may be a reduced number of AEs 520 relative to a number of AEs 520 that are expected to be used if a communication link is established with the neighbor cell, and the UE performs beam refinement with the neighbor cell. For example, the UE may use only one AE 520 per measurement of the reference signals to obtain an initial measurement of the RSs.

As indicated above, FIG. 5 is provided as an example. Other examples may differ from what is described with regard to FIG. 5.

Figure 6:
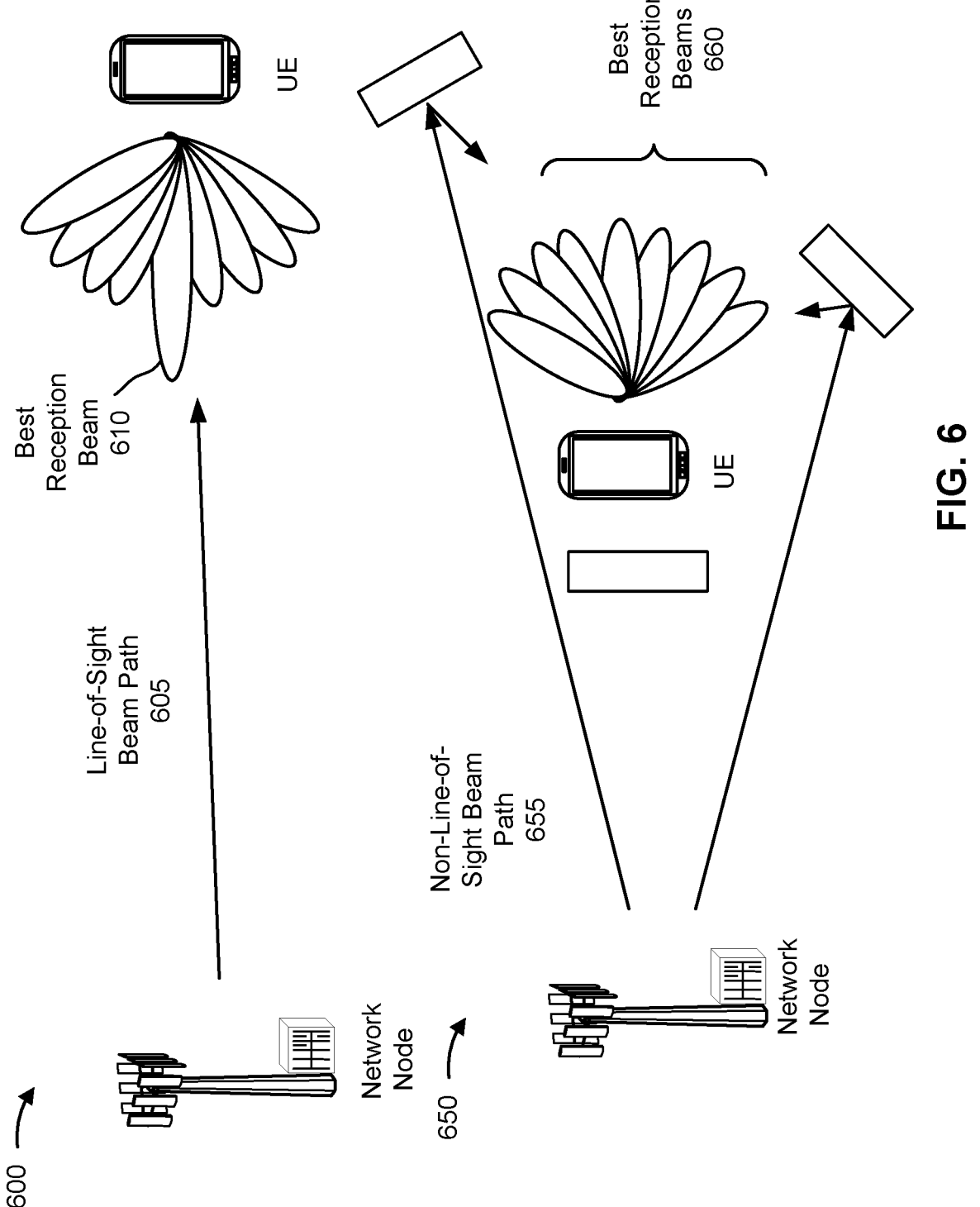
FIG. 6 is a diagram illustrating an example associated with beam selection, in accordance with the present disclosure.

FIG. 6 is a diagram illustrating an examples 600 and 650 associated with beam selection, in accordance with the present disclosure. Examples 600 and 650 may be associated with a UE measuring RSs from a neighbor, with measurements to be used for a cell selection or reselection operation. For example, the UE may be connected to a current cell and may be configured to measure RSs from one or more neighbor cells to determine if the UE should switch over from the current cell to a neighbor cell associated with the RSs.

As shown in example 600, a network node (e.g., a network node associated with the neighbor cell) and the UE may have a line-of-sight (LOS) beam path 605. The network node my transmit one or more RSs to the UE along the LOS beam path 605. The UE may measure the one or more RSs using multiple beams to identify a best reception beam 610. Based at least in part on the UE receiving the RSs via the LOS beam path 605, the best reception beam 610 may be associated with a signal strength of the RSs that is significantly higher than other reception beams. For example, the best reception beam 610 may be a threshold amount (e.g., in decibels) higher than a next best reception beam. Additionally, or alternatively, the best reception beam 610 may be associated with threshold number of standard deviations from a metric, such as a mean signal strength, mode signal strength, or a next best reception beam, as measured by other reception beams (e.g., all reception beams or all reception beams associated with a same antenna panel, among other examples). The best LOS reception beam 605 may be associated with the signal strength of the RSs that is significantly higher than the other reception beams based at least in part on receiving the RSs via the LOS beam path 605.

As further shown in example 650, a network node (e.g., a network node associated with the neighbor cell) and the UE may have a non-line-of-sight (non-LOS) beam path 655. The network node may transmit one or more RSs to the UE along the non-LOS beam path 655. The UE may measure the one or more RSs using multiple reception beams to attempt to identify a best reception beam. Based at least in part on the UE receiving the RSs via the non-LOS beam path 605, the UE may have multiple best reception beams 660. For example, the UE may not have a single best reception beam that is associated with a signal strength of the RSs that is significantly higher than other reception beams. A best reception beam, as measured via the non-LOS beam path 655 may not be a threshold amount (e.g., in decibels) higher than a next best reception beam and/or may not be associated with threshold number of standard deviations from a metric as measured by other reception beams. For example, the best reception beam may not be associated with a signal strength of the reference signals that is significantly higher than other reception beam based at least in part on the RSs refracting or reflecting off of an object (e.g., and widening a beam on which the RSs travel) and/or traveling through multiple beam paths to different reception beams with similar measured signal strength, among other examples.

Based at least in part on the best reception beam 610 used to measure RSs via the LOS beam path 605 having a signal strength that is significantly higher than other beams, beam refinement may provide a first amount of beam refinement gain (e.g., a relatively high amount of beam refinement gain). Based at least in part on multiple best reception beams 660 used to measure RSs via the non-LOS beam path 655 having generally the same signal strength, beam refinement may provide a second amount of beam refinement gain (e.g., a relatively low amount of beam refinement gain).

As indicated above, FIG. 6 is provided as an example. Other examples may differ from what is described with regard to FIG. 6.

In some networks, a UE may be indicated to measure neighbor cells and to report signal strengths (e.g., RSRP) of the neighbor cells. For example, the UE may be camped on a cell associated with a first RAT (e.g., LTE) and/or a first FR (e.g., FR1) for connection to a network. A network node may indicate that the UE is to measure RSs from neighbor cells. The neighbor cells may be associated with a second RAT and/or a second FR (e.g., FR2 or higher). The UE may be configured to report a signal strength of the neighbor cells based at least in part on (e.g., only if) the signal strength satisfies a threshold (e.g., an RSRP satisfies a B1 threshold). Based at least in part on the network receiving a B1 event indication from the UE, the network node may initiate a cell addition and/or reselection so the UE can connect to the neighbor cell. For example, the UE may connect to the neighbor cell as a standalone connection or a non-standalone connection.

The UE may use first level beams (e.g., L0 beams, L1 beams, and/or single element beams, among other examples) to measure signal strengths of neighbor cells (e.g., via the RSs). If the B1 event is reported and/or triggered, the UE may acquire the neighbor cell and the UE may perform beam refinement using second level beams (e.g., third level beams and/or multiple element beams, among other examples). Based at least in part on a signal strength as received and/or measured by a first level beam (e.g., when measuring for the B1 event) being lower than a signal strength as received and/or measured by an second level beam (e.g., when connected), a beam refinement gain may be defined and added to the signal strength as measured by the first level beam. The beam refinement gain may be a configured value to characterize refinement gain expected to be achieved by refining the first level beam to the second level beam. The UE may add the beam refinement gain to a measurement via the first level beam so that a signal strength when using the second level beam may be estimated and reported to the network node as part of a B1 event (e.g., a cell reselection, cell selection, and/or cell addition event, among other examples).

The value of the beam refinement gain may be based at least in part on testing and/or calculating the amount of gain in a lab environment (e.g., using a Beam-Char (APvT) model). The testing and/or calculating is based at least in part on using a LOS characterization of the RSs. However, gain characterized using an LOS method of characterization without considering relative orientation of the UE and a network node (e.g., when used for a UE that is in an out-of-coverage orientation), may result in inaccuracy in an estimated signal strength that is reported to the network node. Based at least in part on the estimated signal strength being inaccurate, the B1 event may be triggered, and the UE may attempt to establish a connection with the neighbor cell when an accurate signal strength would not justify establishing the connection. This may cause the UE to establish the connection with the neighbor cell with a poor signal strength (e.g., a signal strength that fails to satisfy a threshold), which may cause a radio link failure (e.g., based at least in part on an actual signal strength failing to satisfy a signal strength threshold, such as the signal strength reported in the B1 event). The radio link failure may cause the UE and the network node to consume computing, power, network, and/or communication resources to reestablish a connection with the network node (e.g., associated with a previous connection). Additionally, or alternatively, the UE may again report an inaccurate estimated signal strength for the neighbor cell based at least in part on an inaccurate beam refinement gain, which may consume additional computing, power, network, and/or communication resources by again establishing the connection with the neighbor cell with a radio link failure. The UE may continue to ping-pong between the cell and the neighbor cell based at least in part on the UE transmitting the inaccurate estimated signal strength for the neighbor cell.

In some aspects described herein, a UE may be configured with multiple beam refinement gains to use for different channel models. For example, the UE may be configured with a first beam refinement gain to use when measuring RSs via an LOS beam path and a second beam refinement gain to use when measuring RSs via a non-LOS beam path. In some aspects, the UE may be configured with a first set of beam refinement gains to use when measuring RSs via an LOS beam path and a second set of beam refinement gain to use when measuring RSs via a non-LOS beam path. For example, the UE may select a beam refinement gain from the first set of beam refinement gains based at least in part on receiving RSs via an LOS beam path and based at least in part on an operational frequency of a channel associated with the RSs. Similarly, the UE may select a beam refinement gain from the second set of beam refinement gains based at least in part on receiving RSs via a non-LOS beam path and based at least in part on an operational frequency of a channel associated with the RSs. Selecting the beam refinement gain based at least in part on the operation frequency of the channel may account for different beam widths, potential beamforming gain, propagation losses, and/or subcarrier spacing, among other examples.

The UE may identify a channel model associated with RSs received at the UE. For example, the UE may identify a channel model as an LOS or non-LOS channel model based at least in part on signal strengths as measured via different beams (e.g., based at least in part on a difference between signal strength as measured by a best beam and a signal strength of one or more other beams), a tap delay, and/or a machine learning model trained to identify different channel models based at least in part on channel metrics, among other examples. Based at least in part on the channel model, the UE may identify a beam refinement gain to apply to a measurement of signal strength of the RSs via a best beam. In some aspects, the UE may identify the beam refinement gain based at least in part on one or more additional parameters, such as an operational frequency associated with the RSs (e.g., a bandwidth part (BWP), FR, and/or allocation associated with the RSs).

The UE may transmit a report associated with the one or more RSs with the report based at least in part on the beam refinement gain associated with the channel model and/or the one or more additional parameters. Based at least in part on the UE using a beam refinement gain that is based at least in part on the channel model and/or the one or more additional parameters, the UE may report signal strength and/or a B1 event with improved accuracy and/or avoid reporting a B1 event when a reselection to the neighbor cell is likely to cause a radio link failure. In this way, the UE may conserve computing, power, network, and/or communication resources that may have otherwise been used to recover from a radio link failure and/or avoid or reduce ping-ponging between cells.

Figure 7:
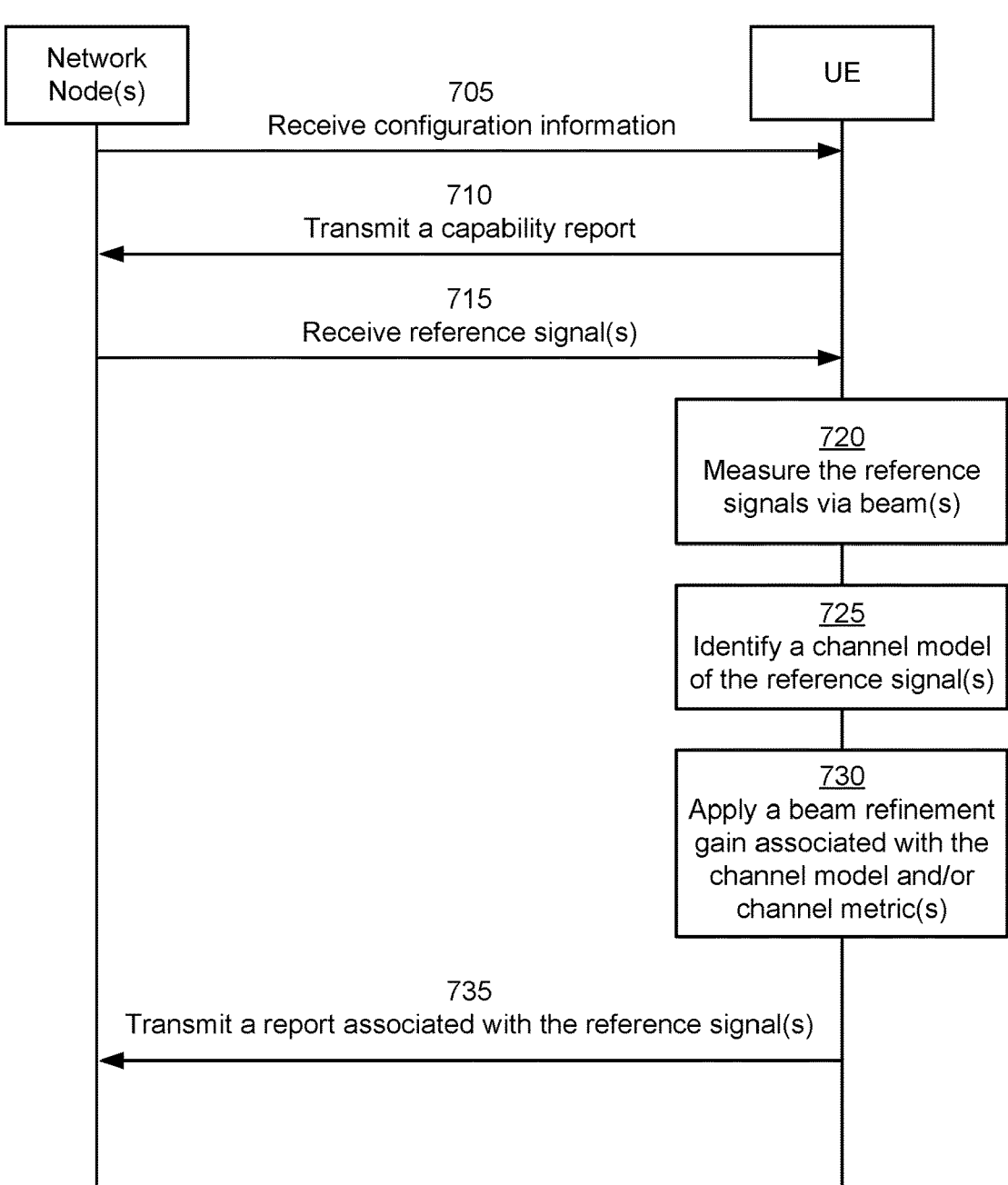

FIG. 7 is a diagram of an example 700 associated with techniques for applying beam refinement gain, in accordance with the present disclosure. As shown in FIG. 7, one or more network nodes (e.g., base station 110, a CU, a DU, and/or an RU) may communicate with a UE (e.g., UE 120). In some aspects, the one or more network nodes and the UE may be part of a wireless network (e.g., wireless network 100). The UE and the one or more network nodes may have established a wireless connection prior to operations shown in FIG. 7. In some aspects, the UE may be configured to measure RSs from a second network node to detect whether cell reselection or cell addition should be performed. In some aspects, the first network node (e.g., a network node with which the UE is connected for communicating with the network) may be associated with a first RAT and/or a first FR and the second network node (e.g., a network node with which the UE is not currently connected for communicating with the network and/or a neighbor network node) may be associated with a second RAT and/or a second FR. The first RAT and the second RAT may be different and/or the first FR, and the second FR may be different (e.g., the second FR may be higher, may have less-reliable coverage, and/or may have a higher signal strength requirement, among other examples).

As shown by reference number 705, the first network node may transmit, and the UE may receive, configuration information. In some aspects, the UE may receive the configuration information via one or more of RRC signaling, one or more MAC-CEs, and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to use a beam refinement gain when reporting a B1 event and/or a signal strength of RSs of a neighbor cell. In some aspects, the configuration information may indicate values of the beam refinement gain associated with different channel models and/or different channel metrics, among other examples. In some aspects, the configuration information may indicate a mapping between beam refinement gain values and different channel models and/or different channel metrics. In some aspects, the configuration information may indicate thresholds and/or other metrics for determining the different channel models. For example, the configuration information may indicate a threshold difference in measured signal strengths between a best beam and other beams to determine whether the UE is in a LOS transmission path. Additionally, or alternatively, the configuration information may indicate a threshold difference in tap delays to determine whether the UE is in a LOS transmission path.

The UE may configure itself based at least in part on the configuration information. In some aspects, the UE may be configured to perform one or more operations described herein based at least in part on the configuration information.

As shown by reference number 710, the UE may transmit, and the first network node may receive, a capabilities report. In some aspects, the capabilities report may indicate UE support for using the beam refinement gain and/or support for using different beam refinement gains (e.g., different values for beam refinement gains) based at least in part on channel models and/or different channel metrics, among other examples.

As shown by reference number 715, the UE may receive, and the second network node may transmit, one or more RSs. For example, the second network node may transmit SSBs and/or CSI-RSs for the UE to measure. The UE may receive the one or more RSs based at least in part on receiving a configuration of the one or more RSs via the network (e.g., via the first network node).

In some aspects, the UE may measure the one or more RSs using multiple beams. For example, the UE may measure signal strengths (e.g., RSRPs) of the one or more RSs, as measured by different beams of the UE. In this way, the UE may identify a strongest beams for receiving communications from the second network node. In some aspects, the one or more RSs may include a set of SSBs and/or a set of CSI-RSs, among other examples.

As shown by reference number 720, the UE may measure the one or more RSs via one or more beams (e.g., UE reception beams). In some aspects, the UE may measure signal strengths of the one or more RSs via the one or more beams to obtain a metric, such as RSRP, signal-to-interference-plus-noise ratio (SINR), and/or signal-to-noise ratio (SNR) associated receiving the RSs via different beams of the one or more beams.

As shown by reference number 725, the UE may identify a channel model of the one or more RSs. In some aspects, the UE channel model may include an LOS channel model or a non-LOS channel model. In some aspects, the UE may identity the channel model from a set of candidate channel models, such as one or more LOS channel models or one or more non-LOS channel models. In some aspects, the UE may identify the channel model based at least in part on measurements of the one or more RSs. For example, the UE may identify the channel model based at least in part on differences in signal strength measurements as obtained using different beams and/or tap delays of the RSs, among other metrics of the RSs. In some aspects, the UE may identify the channel model based at least in part on the channel model being associated with one or more channel parameters. For example, the channel model may be associated with one or more clusters of reception times of the one or more of reference signals, angular spread of the one or more clusters, and/or relative signal strengths of the one or more clusters, among other examples. In some aspects, the channel model may be associated with one or more clusters of relatively high measurements of the RSs, angular spread of the one or more clusters, and/or relative signal strengths of the one or more clusters, among other examples.

In some aspects, the UE may identify the channel model based at least in part on an output of a machine learning model trained to identify the channel model. The machine learning model may be trained based at least in part on channel metrics as inputs and radio link failures of B1 events associated with the channel metrics as outputs. For example, the machine learning model may be trained to identify channel metrics as being indicators of a likely radio link failure if a B1 event is reported. The UE and/or the machine learning model may use the identification from the machine learning model to determine an appropriate beam forming gain associated with the channel metrics to reduce a likelihood of a radio link failure if a B1 event is reported.

In some examples, the UE may identify an LOS channel model based at least in part on a difference in measured signal strength between a best beam and other beams satisfying a difference threshold and/or based at least in part on a tap delay satisfying a delay spread threshold. In some aspects, the UE may identify a non-LOS channel model based at least in part on a difference in measured signal strength between a best beam and other beams failing to satisfy a threshold and/or based at least in part on a tap delay failing to satisfy a threshold, among other examples.

In some aspects, the difference threshold and/or the delay spread threshold may be configured by the network and/or via a communication standard. In some aspects, the difference threshold and/or the delay spread threshold may be associated with a standard deviation and/or variance, or another statistical metrics, associated with measurements of the one or more RSs via the beams of the UE.

As shown by reference number 730, the UE may apply a beam refinement gain associated with the channel model and/or one or more channel metrics. The beam refinement gain may be associated with an expected difference in signal strength when using one or more additional antenna elements to receive subsequent communications via a cell associated with the one or more reference signals. In some aspects, the beam refinement gain is a value of a set of candidate beam refinement gains, with the set of candidate beam refinement gains mapping to different channel models and/or channel metrics. In some aspects, the UE may select the beam refinement gain and/or the value of the beam refinement gain based at least in part on the channel model and/or the channel metrics.

In some aspects, the beam refinement gain is mapped to the channel model and/or the one or more channel metrics. For example, the UE may use a first value of a beam refinement gain when the UE identifies a non-LOS channel model or a second value of a beam refinement gain when the UE identifies an LOS channel model.

In some aspects, the UE may use a value of a beam refinement gain based at least in part on a frequency of operation associated with the one or more reference signals, one or more clusters of reception times of the one or more of reference signals (e.g., beams measuring the RSs with relatively high signal strengths), angular spread of the one or more clusters, and/or relative signal strengths of the one or more clusters, among other examples.

As shown by reference number 735, the UE may transmit, and the first network node may receive, a report associated with the one or more RSs. In some aspects, the report may indicate a signal strength of the strongest beam, with the signal strength being based at least in part on a measurement of an RS via the strongest beam, and a beam refinement gain (e.g., a sum). In some aspects, the report may indicate a B1 event.

Based at least in part on the UE using a beam refinement gain that is based at least in part on the channel model and/or the one or more additional parameters, the UE may report signal strength and/or a B1 event with improved accuracy and/or avoid reporting a B1 event when a reselection to the neighbor cell is likely to cause a radio link failure. In this way, the UE may conserve computing, power, network, and/or communication resources that may have otherwise been used to recover from a radio link failure and/or avoid or reduce ping-ponging between cells.

As indicated above, FIG. 7 is provided as an example. Other examples may differ from what is described with respect to FIG. 7.

FIG. 8 is a diagram of an example 800 associated with techniques for applying beam refinement gain, in accordance with the present disclosure. As shown in FIG. 8, one or more network nodes (e.g., base station 110, a CU, a DU, and/or an RU) may communicate with a UE (e.g., UE 120). In some aspects, the one or more network nodes and the UE may be part of a wireless network (e.g., wireless network 100). In some aspects, the UE may be configured to measure RSs from a second network node to detect whether cell reselection or cell addition should be performed. In some aspects, the first network node (e.g., a network node with which the UE is connected for communicating with the network) may be associated with a first RAT and/or a first FR, and the second network node (e.g., a network node with which the UE is not currently connected for communicating with the network and/or a neighbor network node) may be associated with a second RAT and/or a second FR. The first RAT and the second RAT may be different, and/or the first FR and the second FR may be different (e.g., the second FR may be higher, may have less-reliable coverage, and/or may have a higher signal strength requirement, among other examples).

As shown by reference number 805, the UE may establish a connection with the first network node via a first cell. For example, the UE may acquire the first cell and may camp on the first cell for communicating with the network.

As shown by reference number 810, the UE may receive one or more RSs via a second cell associated with the second network node. In some aspects, the UE may sweep through beams of the UE to receive and measure the one or more RSs from the second network node. In some aspects, the one or more RSs may include SSBs and/or CSI-RSs.

As shown by reference number 815, the UE may identify a channel model associated with the one or more RSs. For example, the UE may identify the channel model as an LOS channel model or a non-LOS channel model. The UE may use, for example, one or more techniques for identifying the channel model described herein.

As shown by reference number 820, the UE may apply a beam refinement gain associated with the channel model. In some aspects, the UE may apply the beam refinement gain by adding the beam refinement gain to a measured signal strength of the one or more RSs as measured by the best beam.

As shown by reference number 825, the UE may transmit, and the first network node may receive, an indication of a signal strength associated with the one or more RSs. For example, the UE may transmit an indication of a B1 event and/or an indication of a signal strengths associated with the one or more RSs. The signal strength may be based at least in part on the beam refinement gain and the measured signal strength of the one or more RSs as measured by the best beam. In some aspects, the first network node may trigger a cell reselection and/or a cell addition (e.g., for non-stand-alone communication) based at least in part on the indication of the signal strength associated with the one or more RSs.

As indicated above, FIG. 8 is provided as an example. Other examples may differ from what is described with respect to FIG. 8.

FIG. 9 is a diagram illustrating an example process 900 performed, for example, by a UE, in accordance with the present disclosure. Example process 900 is an example where the UE (e.g., UE 120) performs operations associated with techniques for applying beam refinement gain.

As shown in FIG. 9, in some aspects, process 900 may include receiving one or more reference signals via one or more beams (block 910). For example, the UE (e.g., using communication manager 140 and/or reception component 1002, depicted in FIG. 10) may receive one or more reference signals via one or more beams, as described above.

As further shown in FIG. 9, in some aspects, process 900 may include identifying a channel model associated with a transmission path of the one or more reference signals (block 920). For example, the UE (e.g., using communication manager 140, reception component 1002, and/or communication manager 1008, depicted in FIG. 10) may identify a channel model associated with a transmission path of the one or more reference signals, as described above.

As further shown in FIG. 9, in some aspects, process 900 may include transmitting a report associated with the one or more reference signals, the report is based at least in part on a beam refinement gain associated with the channel model (block 930). For example, the UE (e.g., using communication manager 140 and/or transmission component 1004, depicted in FIG. 10) may transmit a report associated with the one or more reference signals, the report is based at least in part on a beam refinement gain associated with the channel model, as described above.

Process 900 may include additional aspects, such as any single aspect or any combination of aspects described below and/or in connection with one or more other processes described elsewhere herein.

In a first aspect, the channel model is a line-of-sight channel model or a non-line-of-sight channel model.

In a second aspect, alone or in combination with the first aspect, the beam refinement gain is based at least in part on one or more of a frequency of operation associated with the one or more reference signals, one or more clusters of reception times of the one or more of reference signals, angular spread of the one or more clusters, or relative signal strengths of the one or more clusters.

In a third aspect, alone or in combination with one or more of the first and second aspects, identification of the channel model comprises measuring signal strengths of the one or more reference signals via multiple beams, and identifying the channel model based at least in part on differences between measured signal strengths as measured via the multiple beams.

In a fourth aspect, alone or in combination with one or more of the first through third aspects, the signaling strengths are based at least in part on one or more of RSRP, SINR, or SNR.

In a fifth aspect, alone or in combination with one or more of the first through fourth aspects, identification of the channel model based at least in part on the differences between measured signal strengths as measured via the multiple beams comprises identifying the channel model based at least in part on whether the differences between measured signal strengths satisfies a difference threshold.

In a sixth aspect, alone or in combination with one or more of the first through fifth aspects, the difference threshold is based at least in part on one or more of a configuration indicated from a network node, a standard deviation associated with the differences, or a variance associated with the differences.

In a seventh aspect, alone or in combination with one or more of the first through sixth aspects, identification of the channel model comprises measuring tap delays of the one or more reference signals, and identifying the channel model based at least in part on whether the tap delays satisfy a delay spread threshold.

In an eighth aspect, alone or in combination with one or more of the first through seventh aspects, the delay spread threshold is based at least in part on a configuration indicated from a network node.

In a ninth aspect, alone or in combination with one or more of the first through eighth aspects, process 900 includes establishing, before receiving the one or more reference signals, a connection via a first cell using a first frequency range, wherein the one or more reference signals are associated with a second cell operating in a second frequency range that is different from the first frequency range.

In a tenth aspect, alone or in combination with one or more of the first through ninth aspects, the first cell is associated with a first RAT and the second cell is associated with a second RAT.

In an eleventh aspect, alone or in combination with one or more of the first through tenth aspects, the beam refinement gain is associated with an expected difference in signal strength when using one or more additional antenna elements to receive subsequent communications via a cell associated with the one or more reference signals.

In a twelfth aspect, alone or in combination with one or more of the first through eleventh aspects, the beam refinement gain is a value of a set of candidate beam refinement gains, wherein the set of candidate beam refinement gains map to different channel models.

In a thirteenth aspect, alone or in combination with one or more of the first through twelfth aspects, the report indicates a signal strength associated with the one or more reference signals, and wherein the signal strength is based at least in part a measured signal strength and the beam refinement gain.

In a fourteenth aspect, alone or in combination with one or more of the first through thirteenth aspects, the one or more reference signals comprise a set of SSBs, or a set of CSI-RSs.

In a fifteenth aspect, alone or in combination with one or more of the first through fourteenth aspects, the channel model is associated with one or more channel parameters comprising one or more of one or more clusters of reception times of the one or more of reference signals, angular spread of the one or more clusters, or relative signal strengths of the one or more clusters.

In a sixteenth aspect, alone or in combination with one or more of the first through fifteenth aspects, identification of the channel model comprises identifying the channel model based at least in part on one or more of an output of a machine learning model trained to identify the channel model, or one or more channel parameters.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
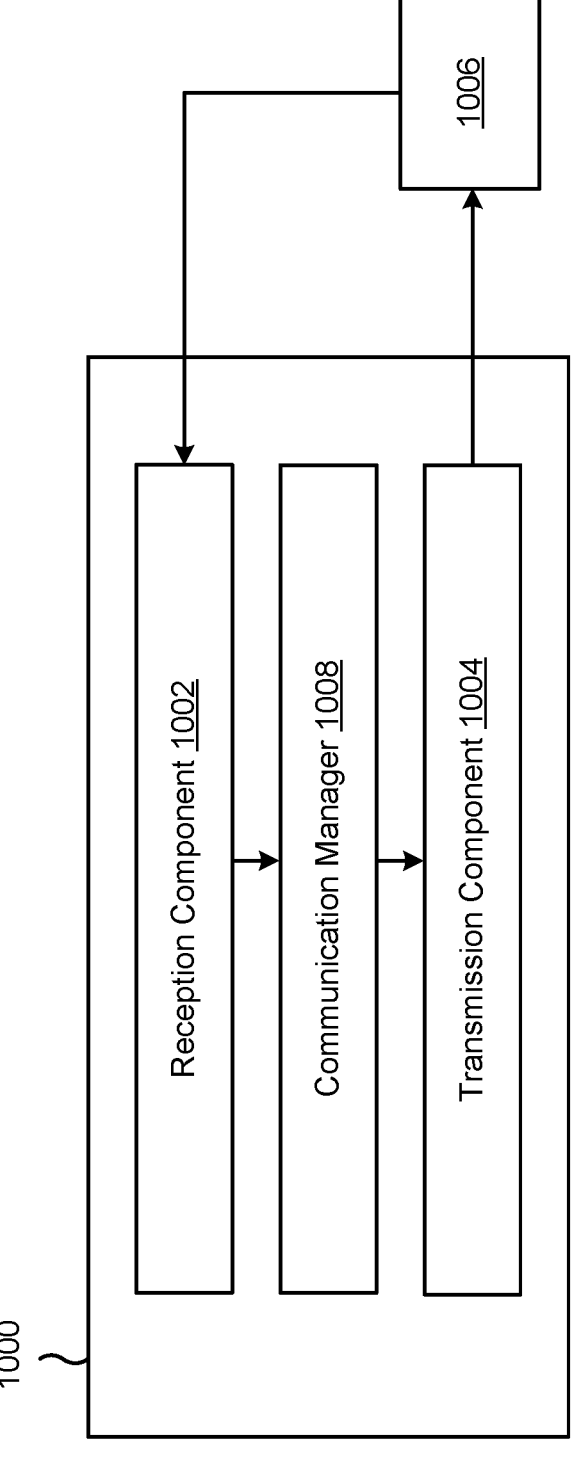
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 7-8. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive one or more reference signals via one or more beams. The communication manager 1008 may identify a channel model associated with a transmission path of the one or more reference signals. The transmission component 1004 may transmit a report associated with the one or more reference signals, the report is based at least in part on a beam refinement gain associated with the channel model.

The communication manager 1008 may establish, before receiving the one or more reference signals, a connection via a first cell using a first frequency range wherein the one or more reference signals are associated with a second cell operating in a second frequency range that is different from the first frequency range.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving one or more reference signals via one or more beams; identifying a channel model associated with a transmission path of the one or more reference signals; and transmitting a report associated with the one or more reference signals, the report is based at least in part on a beam refinement gain associated with the channel model.

Aspect 2: The method of Aspect 1, wherein the channel model is a line-of-sight channel model or a non-line-of-sight channel model.

Aspect 3: The method of any of Aspects 1-2, wherein the beam refinement gain is based at least in part on one or more of: a frequency of operation associated with the one or more reference signals, one or more clusters of reception times of the one or more of reference signals, angular spread of the one or more clusters, or relative signal strengths of the one or more clusters.

Aspect 4: The method of any of Aspects 1-3, wherein identification of the channel model comprises: measuring signal strengths of the one or more reference signals via multiple beams; and identifying the channel model based at least in part on differences between measured signal strengths as measured via the multiple beams.

Aspect 5: The method of Aspect 4, wherein the signaling strengths are based at least in part on one or more of: reference signal received power (RSRP), signal-to-interference-plus-noise ratio (SINR), or signal-to-noise ratio (SNR).

Aspect 6: The method of any of Aspects 4-5, wherein identification of the channel model based at least in part on the differences between measured signal strengths as measured via the multiple beams comprises: identifying the channel model based at least in part on whether the differences between measured signal strengths satisfies a difference threshold.

Aspect 7: The method of Aspect 6, wherein the difference threshold is based at least in part on one or more of: a configuration indicated from a network node, a standard deviation associated with the differences, or a variance associated with the differences.

Aspect 8: The method of any of Aspects 1-7, wherein identification of the channel model comprises: measuring tap delays of the one or more reference signals; and identifying the channel model based at least in part on whether the tap delays satisfy a delay spread threshold.

Aspect 9: The method of Aspect 8, wherein the delay spread threshold is based at least in part on a configuration indicated from a network node.

Aspect 10: The method of any of Aspects 1-9, further comprising: establishing, before receiving the one or more reference signals, a connection via a first cell using a first frequency range, wherein the one or more reference signals are associated with a second cell operating in a second frequency range that is different from the first frequency range.

Aspect 11: The method of Aspect 10, wherein the first cell is associated with a first radio access technology (RAT) and the second cell is associated with a second RAT.

Aspect 12: The method of any of Aspects 1-11, wherein the beam refinement gain is associated with an expected difference in signal strength when using one or more additional antenna elements to receive subsequent communications via a cell associated with the one or more reference signals.

Aspect 13: The method of any of Aspects 1-12, wherein the beam refinement gain is a value of a set of candidate beam refinement gains, wherein the set of candidate beam refinement gains map to different channel models.

Aspect 14: The method of any of Aspects 1-13, wherein the report indicates a signal strength associated with the one or more reference signals, and wherein the signal strength is based at least in part a measured signal strength and the beam refinement gain.

Aspect 15: The method of any of Aspects 1-14, wherein the one or more reference signals comprise: a set of synchronization signal blocks (SSBs), or a set of channel state information (CSI) reference signals (RSs).

Aspect 16: The method of any of Aspects 1-15, wherein the channel model is associated with one or more channel parameters comprising one or more of: one or more clusters of reception times of the one or more of reference signals, angular spread of the one or more clusters, or relative signal strengths of the one or more clusters.

Aspect 17: The method of any of Aspects 1-16, wherein identification of the channel model comprises identifying the channel model based at least in part on one or more of: an output of a machine learning model trained to identify the channel model, or one or more channel parameters.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method of wireless communication performed by a user equipment (UE), comprising:
  receiving one or more reference signals via multiple beams;
  measuring signal strengths of the one or more reference signals via the multiple beams;

identifying a channel model associated with a transmission path of the one or more reference signals based at least in part on a difference between a first signal strength, of the one or more reference signals measured using a first beam of the multiple beams, and a second signal strength of the one or more reference signals measured using a second beam of the multiple beams, wherein the channel model is identified as a line-of-sight channel model based at least in part on the difference being greater than or equal to a difference threshold, or wherein the channel model is identified as a non-line-of-sight channel model based at least in part on the difference being less than the difference threshold; and transmitting a report associated with the one or more reference signals, wherein the report is based at least in part on a beam refinement gain associated with the channel model.

2. The method of claim 1, wherein the beam refinement gain is based at least in part on one or more of:

a frequency of operation associated with the one or more reference signals, one or more clusters of reception times of the one or more reference signals, angular spread of the one or more clusters, or relative signal strengths of the one or more clusters.

3. The method of claim 1, wherein the signal strengths are based at least in part on one or more of:

reference signal received power (RSRP), signal-to-interference-plus-noise ratio (SINR), or signal-to-noise ratio (SNR).

4. The method of claim 1, wherein the difference threshold is based at least in part on one or more of:

a configuration indicated from a network node, a standard deviation value associated with the difference, or a variance associated with the difference.

5. The method of claim 1, wherein identification of the channel model comprises:

measuring tap delays of the one or more reference signals; and identifying the channel model based at least in part on whether the tap delays satisfy a delay spread threshold.

6. The method of claim 1, wherein the beam refinement gain is associated with an expected difference in signal strength when using one or more additional antenna elements to receive subsequent communications via a cell associated with the one or more reference signals.

7. The method of claim 1, wherein the beam refinement gain is a value of a set of candidate beam refinement gains, wherein the set of candidate beam refinement gains map to different channel models.

8. The method of claim 1, wherein the report indicates the first signal strength.

9. The method of claim 1, wherein the one or more reference signals comprise:

a set of synchronization signal blocks (SSBs), or a set of channel state information (CSI) reference signals (RSs).

10. The method of claim 1, wherein the channel model is associated with one or more channel parameters comprising one or more of:

one or more clusters of reception times of the one or more reference signals, angular spread of the one or more clusters, or relative signal strengths of the one or more clusters.

11. The method of claim 1, wherein identification of the channel model comprises identifying the channel model based at least in part on one or more of:

an output of a machine learning model trained to identify the channel model, or one or more channel parameters.

12. The method of claim 1, wherein the first beam is a best beam of the multiple beams.

13. The method of claim 1, further comprising:

applying a first beam refinement gain based at least in part on the channel model being identified as a line-of-sight channel model, or applying a second beam refinement gain based at least in part on the channel model being identified as a non-line-of-sight channel model.

14. A user equipment (UE) for wireless communication, comprising:

one or more memories; and one or more processors, coupled to the one or more memories, configured to:

receive one or more reference signals via multiple beams;

measure signal strengths of the one or more reference signals via the multiple beams;

identify a channel model associated with a transmission path of the one or more reference signals based at least in part on a difference between a first signal strength, of the one or more reference signals measured using a first beam of the multiple beams, and a second signal strength of the one or more reference signals measured using a second beam of the multiple beams, wherein the one or more processors, to identify the channel model, are configured to:

identify the channel model as a line-of-sight channel model based at least in part on the difference being greater than or equal to a difference threshold, or identify the channel model as a non-line-of-sight channel model based at least in part on the difference being less than the difference threshold; and transmit a report associated with the one or more reference signals, wherein the report is based at least in part on a beam refinement gain associated with the channel model.

15. The UE of claim 14, wherein the beam refinement gain is based at least in part on one or more of:

a frequency of operation associated with the one or more reference signals, one or more clusters of reception times of the one or more reference signals, angular spread of the one or more clusters, or relative signal strengths of the one or more clusters.

16. The UE of claim 14, wherein the signal strengths are based at least in part on one or more of:

reference signal received power (RSRP), signal-to-interference-plus-noise ratio (SINR), or signal-to-noise ratio (SNR).

17. The UE of claim 14, wherein the difference threshold is based at least in part on one or more of:

a configuration indicated from a network node, a standard deviation associated with the difference, or a variance associated with the difference.

18. The UE of claim 14, wherein the one or more processors, to identify the channel model, are configured to:

measure tap delays of the one or more reference signals; and identify the channel model based at least in part on whether the tap delays satisfy a delay spread threshold.

19. The UE of claim 14, wherein the beam refinement gain is associated with an expected difference in signal strength when using one or more additional antenna elements to receive subsequent communications via a cell associated with the one or more reference signals.

20. The UE of claim 14, wherein the beam refinement gain is a value of a set of candidate beam refinement gains, wherein the set of candidate beam refinement gains map to different channel models.

21. The UE of claim 14, wherein the report indicates the first signal strength.

22. The UE of claim 14, wherein the one or more reference signals comprise:

a set of synchronization signal blocks (SSBs), or a set of channel state information (CSI) reference signals (RSs).

23. The UE of claim 14, wherein the channel model is associated with one or more channel parameters comprising one or more of:

one or more clusters of reception times of the one or more reference signals, angular spread of the one or more clusters, or relative signal strengths of the one or more clusters.

24. The UE of claim 14, wherein the one or more processors, to identify the channel model, are configured to identify the channel model based at least in part on one or more of:

an output of a machine learning model trained to identify the channel model, or one or more channel parameters.

25. The UE of claim 14, wherein the first beam is a best beam of the multiple beams.

26. The UE of claim 14, wherein the one or more processors are further configured to:

apply a first beam refinement gain based at least in part on the channel model being identified as a line-of-sight channel model, or apply a second beam refinement gain based at least in part on the channel model being identified as a non-line-of-sight channel model.

27. A non-transitory computer-readable medium storing a set of instructions for wireless communication, the set of instructions comprising:

one or more instructions that, when executed by one or more processors of a user equipment (UE), cause the UE to:

receive one or more reference signals via multiple beams;

measure signal strengths of the one or more reference signals via the multiple beams;

identify a channel model associated with a transmission path of the one or more reference signals based at least in part on a difference between a first signal strength, of the one or more reference signals measured using a first beam of the multiple beams, and a second signal strength of the one or more reference signals measured using a second beam of the multiple beams, wherein the one or more instructions, to cause the UE to identify the channel model, cause the UE to:

identify the channel model as a line-of-sight channel model based at least in part on the difference being greater than or equal to a difference threshold, or identify the channel model as a non-line-of-sight channel model based at least in part on the difference being less than the difference threshold; and transmit a report associated with the one or more reference signals, wherein the report is based at least in part on a beam refinement gain associated with the channel model.

28. The non-transitory computer-readable medium of claim 27, wherein the one or more instructions further cause the UE to:

apply a first beam refinement gain based at least in part on the channel model being identified as a line-of-sight channel model, or apply a second beam refinement gain based at least in part on the channel model being identified as a non-line-of-sight channel model.

29. An apparatus for wireless communication, comprising:

means for receiving one or more reference signals via multiple beams;

means for measuring signal strengths of the one or more reference signals via the multiple beams;

means for identifying a channel model associated with a transmission path of the one or more reference signals based at least in part on a difference between a first signal strength, of the one or more reference signals measured using a first beam of the multiple beams, and a second signal strength of the one or more reference signals measured using a second beam of the multiple beams, wherein the means for identifying the channel model comprises:

means for identifying the channel model as a line-of-sight channel model based at least in part on the difference being greater than or equal to a difference threshold, or means for identifying the channel model as a non-line-of-sight channel model based at least in part on the difference being less than the difference threshold; and means for transmitting a report associated with the one or more reference signals, wherein the report is based at least in part on a beam refinement gain associated with the channel model.

30. The apparatus of claim 29, further comprising:

means for applying a first beam refinement gain based at least in part on the channel model being identified as a line-of-sight channel model, or means for applying a second beam refinement gain based at least in part on the channel model being identified as a non-line-of-sight channel model.

* * * * *